US012687688B2

(12) United States Patent
Mukai et al.

(10) Patent No.: US 12,687,688 B2
(45) Date of Patent: Jul. 21, 2026

(54) OPTICAL FIBER CABLE

(71) Applicant: Fujikura Ltd., Tokyo (JP)

(72) Inventors: Okimi Mukai, Sakura (JP); Ken Osato, Sakura (JP); Akira Namazue, Sakura (JP)

(73) Assignee: Fujikura Ltd., Tokyo (JP)

( * ) Notice: Subject to any disclaimer, the term of this patent is extended or adjusted under 35 U.S.C. 154(b) by 284 days.

(21) Appl. No.: 18/560,427

(22) PCT Filed: Apr. 20, 2022

(86) PCT No.: PCT/JP2022/018319
§ 371 (c)(1),
(2) Date: Nov. 13, 2023

(87) PCT Pub. No.: WO2022/244584
PCT Pub. Date: Nov. 24, 2022

(65) Prior Publication Data
US 2024/0248270 A1      Jul. 25, 2024

(30) Foreign Application Priority Data

May 18, 2021    (JP) ................................. 2021-083719

(51) Int. Cl.
*G02B 6/44*          (2006.01)
(52) U.S. Cl.
CPC ........... *G02B 6/4432* (2013.01); *G02B 6/443* (2013.01); *G02B 6/4435* (2013.01);
(Continued)

(58) Field of Classification Search
CPC .... G02B 6/4403; G02B 6/443; G02B 6/4432; G02B 6/4435; G02B 6/4438; G02B 6/4485; G02B 6/449
See application file for complete search history.

(56) References Cited

U.S. PATENT DOCUMENTS 6,606,436 B2 * 8/2003 Logan .................. G02B 6/4433
                                                    385/113
8,620,124 B1 * 12/2013 Blazer .................. G02B 6/4413
                                                    385/102
(Continued)

FOREIGN PATENT DOCUMENTS

CN          204790122 U   * 11/2015
CN          207281361 U     4/2018
(Continued)

OTHER PUBLICATIONS

Translation of Takahashi et al JP 2006-171570 A. (Year: 2006).*
(Continued)

*Primary Examiner* — Ryan A Lepisto
(74) *Attorney, Agent, or Firm* — Osha Bergman Watanabe & Burton LLP

(57) ABSTRACT

An optical fiber cable includes optical fibers, a wrapping tube that wraps around the optical fibers and contacts outermost ones of the optical fibers, and a sheath that covers the wrapping tube and has recesses on an inner circumferential surface of the sheath. The recesses are recessed toward a radially outer side of the optical fiber cable such that a space exists between the wrapping tube and the sheath in each of the recesses.

11 Claims, 2 Drawing Sheets

(52) U.S. Cl.
CPC .......... *G02B 6/4403* (2013.01); *G02B 6/4438* (2013.01); *G02B 6/4485* (2013.01); *G02B 6/449* (2013.01)

(56) References Cited

U.S. PATENT DOCUMENTS

| | | | | |
|---|---|---|---|---|
| 9,086,556 | B2 * | 7/2015 | Keller | G02B 6/4429 |
| 9,625,670 | B2 * | 4/2017 | Chen | G02B 6/52 |
| 10,126,517 | B2 * | 11/2018 | Clampitt | G02B 6/4434 |
| 10,775,581 | B2 * | 9/2020 | Sato | G02B 6/449 |
| 11,048,054 | B2 * | 6/2021 | Shimizu | G02B 6/441 |
| 11,262,515 | B2 * | 3/2022 | Ohno | G02B 6/441 |
| 2005/0167146 | A1 | 8/2005 | Wiekhorst et al. | |
| 2015/0268437 | A1 | 9/2015 | Chen et al. | |
| 2019/0227248 | A1 * | 7/2019 | Isaji | G02B 6/4486 |
| 2019/0310437 | A1 * | 10/2019 | Sato | G02B 6/566 |
| 2021/0003797 | A1 | 1/2021 | Feng et al. | |

FOREIGN PATENT DOCUMENTS

| | | | |
|---|---|---|---|
| CN | 111239942 | A | 6/2020 |
| JP | H09166735 | A | 6/1997 |
| JP | 2001-228373 | A | 8/2001 |
| JP | 2006-098791 | A | 4/2006 |
| JP | 2006171570 | A * | 6/2006 |
| JP | 2009115926 | A | 5/2009 |
| JP | 2010071862 | A | 4/2010 |
| JP | 2012108276 | A | 6/2012 |
| JP | 2013-127556 | A | 6/2013 |
| JP | 2013109172 | A | 6/2013 |
| JP | 2014-139609 | A | 7/2014 |
| JP | 2015176642 | A | 10/2015 |
| JP | 2017-134267 | A | 8/2017 |
| JP | 2018-112604 | A | 7/2018 |
| NA | 109844596 | A | 6/2019 |
| WO | 03085436 | A1 | 10/2003 |
| WO | 2018101041 | A1 | 6/2018 |
| WO | 2020095958 | A1 | 5/2020 |

OTHER PUBLICATIONS

International Search Report issued in corresponding International Application No. PCT/JP2022/018319 mailed Jun. 7, 2022 (6 pages).

* cited by examiner

<u>Fig. 1</u>

OPTICAL FIBER CABLE

CROSS-REFERENCE TO RELATED APPLICATIONS

The present application claims priority to Japanese Patent Application No. 2021-83719, filed May 18, 2021. The contents of this application are incorporated herein by reference in their entirety.

BACKGROUND

Technical Field

The present invention relates to a slotless-type optical fiber cable.

Description of the Related Art

The slotless-type optical fiber cable including the twisted optical fibers, the wrapping tape covering the optical fibers, and the jacket covering the wrapping tape is known (refer to, for example, Patent Document 1).

PATENT DOCUMENT

PATENT DOCUMENT 1: JP 2014-139609 A1

In the above-described slotless-type optical fiber cable, it is possible to suppress deterioration of the transmission characteristics of the optical fiber due to shrinkage of the jacket at low temperatures by reducing the packing density of the optical fiber. Then, it is possible to lower the packing density by increasing the outer diameter of the optical fiber cable itself. However, when installing the optical fiber cable in the existing duct, the outer diameter of the optical fiber cable is limited.

Further, when manufacturing the optical fiber cable, the optical fiber is fed in a state where a certain tension is applied to the optical fiber. Therefore, if the pull-out force of the optical fiber in the optical fiber cable (the force required to start the relative movement of the optical fiber with respect to the optical fiber cable when the optical fiber is pulled) is weak, a defective product may be manufactured. Further, if the pull-out force of the optical fiber is weak, the optical fiber may stick out from the end of the optical fiber cable during or after installing the optical fiber cable. Therefore, it is necessary to secure a pull-out force equal to or greater than a predetermined value. However, when the packing density of the optical fiber in the above-described slotless-type optical fiber cable decreases, the pull-out force of the optical fiber may also decrease.

SUMMARY

One or more embodiments provide an optical fiber cable capable of reducing the packing density while maintaining the outer diameter and the pull-out force.

An optical fiber cable according to one or more embodiments is an optical fiber cable comprising: optical fibers; a wrapping tube that wraps around the optical fibers and contacts outermost optical fibers included in the optical fibers; and a sheath covering the wrapping tube, wherein the sheath has recesses formed on an inner circumferential surface of the sheath and recessed toward a radially outer side of the optical fiber cable, and each of the recesses forms a space between the wrapping tube and the sheath.

In the above embodiments, each of the recesses may include a bottom having an arc shape.

In the above embodiments, each of the recesses may include first and second sidewalls connected to the bottom, and an angle between the first sidewall and the second sidewall may be equal to or greater than 90 degrees.

In the above embodiments, each of the recesses may include first and second sidewalls connected to the bottom, and each of ends of the first and second sidewalls on a radially inner side of the optical fiber cable may have an arc shape.

In the above embodiments, the optical fiber cable may further comprise a tensile strength member embedded in the sheath, and one of the recesses and the tensile strength member may overlap with each other toward a radial direction of the optical fiber cable.

In the above embodiments, the sheath may have protrusions formed on an outer circumferential surface of the sheath and protruded toward the radially outer side of the optical fiber cable, and one of the recesses and one of the protrusions may overlap with each other toward a radial direction of the optical fiber cable.

In the above embodiments, the optical fiber cable may be a slotless-type optical fiber cable having no rod with slots.

In the above embodiments, a wrapping tape may be longitudinally wound around the optical fibers to form the wrapping tube, and a lap portion in which ends of the wrapping tape are laid on each other may not overlap with the recesses toward a radial direction of the optical fiber cable.

In the above embodiments, the sheath may include main surfaces interposed between the recesses adjacent to each other along a circumferential direction of the optical fiber cable, and a following formula (1) may be satisfied.

$$20\% \leqq CL1/CL0 \times 100 \leqq 80\% \tag{1}$$

In the above formula (1), CL0 is the length of a virtual inscribed circle inscribed in the main surfaces, and CL1 is the total length of the main surfaces.

According to one or more embodiments, because the recesses that are recessed toward the radially outer side of the optical fiber cable is formed on the inner circumferential surface of the sheath and each of the recesses forms a space between the wrapping tube and the sheath, it is possible to reduce the packing density while maintaining the outer diameter of the optical fiber cable and the pull-out force or the optical fiber.

DESCRIPTION OF THE EMBODIMENTS

Hereinafter, embodiments will be described with reference to the drawings.

Figure 1:
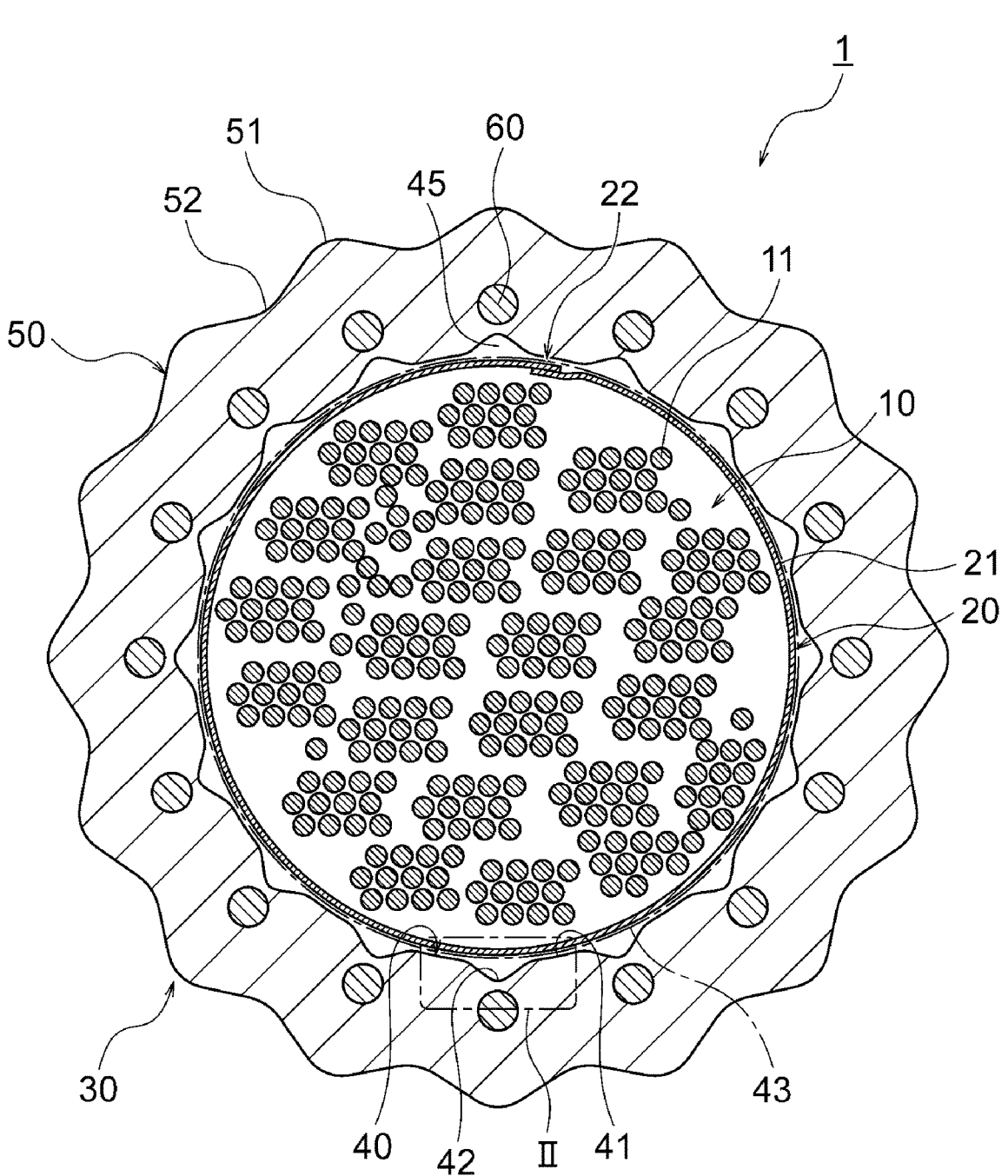
FIG. 1 is a cross-sectional view showing the optical fiber cable in one or more embodiments.
Figure 2:
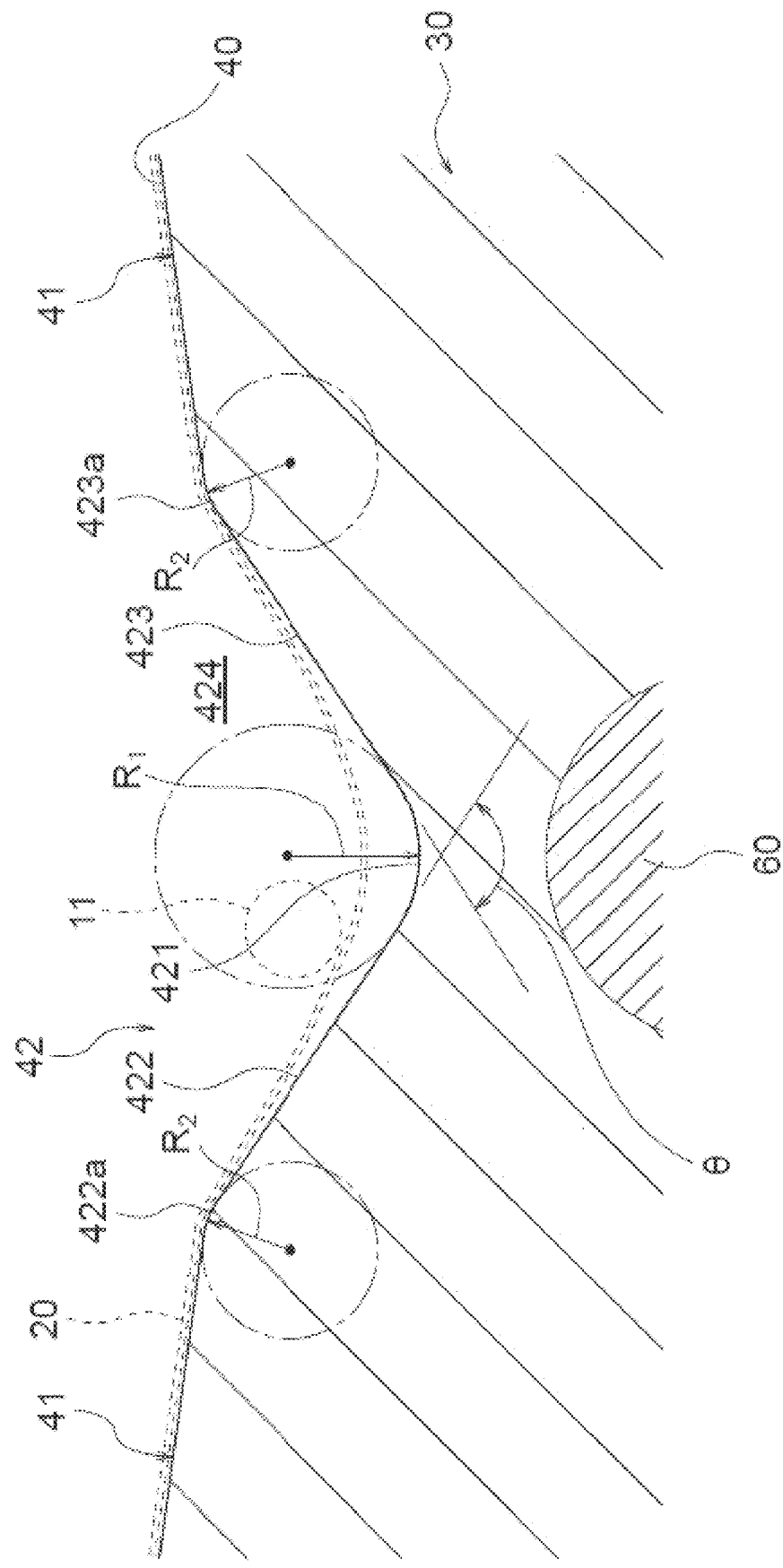
FIG. 2 is an enlarged cross-sectional view showing the inner recess in one or more embodiments and is an enlarged view of II portion of FIG. 1.

FIG. 1 is a cross-sectional view showing the optical fiber cable 1 in one or more embodiments. FIG. 2 is an enlarged cross-sectional view showing the inner recess in one or more embodiments and is an enlarged view of II portion of FIG.

1. FIG. 1 and FIG. 2 are cross-sectional views of the optical fiber cable 1 cut along the direction substantially perpendicular to the longitudinal direction (axial direction) of the optical fiber cable 1.

As shown FIG. 1, the optical fiber cable 1 of one or more embodiments includes the optical fiber assembly 10 including the optical fibers 11, the wrapping tube 20 wrapping around the optical fiber assembly 10, the sheath 30 covering the wrapping tube 20, and the tensile strength members 60 embedded in the sheath 30. The optical fiber cable 1 is a so-called slotless-type optical fiber cable having no rod with slots. Therefore, the wrapping tube 20 wrapping around the optical fiber assembly 10 directly contacts the outermost optical fibers 11 of the optical fiber assembly 10.

The optical fiber cable 1 of one or more embodiments is an optical fiber cable that is installed in an already installed duct or flow path. Therefore, the outer diameter of the sheath 30 of the optical fiber cable 1 is limited due to restrictions such as the inner diameter of the existing duct. The use of the optical fiber cable 1 is not particularly limited to the above.

The optical fiber assembly 10 is formed by twisting the optical fiber units together. Each of the optical fiber units is formed by bundling the optical fiber ribbons. As an example of the optical fiber ribbon, a so-called intermittently fixed optical fiber ribbon in which the optical fibers 11 arranged in parallel are intermittently connected by an adhesive portion can be exemplified.

In one or more embodiments, the optical fiber units constituting the optical fiber assembly 10 are twisted together in the SZ twisting manner. The SZ twisting manner is a method of twisting linear bodies while reversing the twisting direction at predetermined intervals. The method of twisting the optical fiber units is not particularly limited to this. For example, the optical fiber units constituting the optical fiber assembly 10 may be twisted in the unidirectional twisting manner. The unidirectional twisting manner is a twisting method having only one direction as a twisting direction and is a twisting method in which the linear bodies are spirally twisted together.

The configuration of the optical fiber unit is not particularly limited to the above configuration. For example, the optical fiber unit may be configured by simply bundling the optical fibers (optical fiber strands) 11 without using an optical fiber ribbon. Alternatively, the optical fiber unit may be configured by twisting the optical fibers 11 together. Alternatively, the optical fiber unit may be configured by winding a linear body around the optical fibers 11 to bundle the optical fibers 11. Also, the configuration of the optical fiber assembly 10 is not particularly limited to the above. For example, the optical fiber assembly 10 may be configured by simply twisting the optical fibers 11 together without using an optical fiber unit.

The optical fiber assembly 10 is covered with the wrapping tube 20. In one or more embodiments, the wrapping tape 21 is longitudinally wound around the outer periphery of the optical fiber assembly 10 to form the wrapping tube 20. Specifically, the wrapping tape 21 is wound around the outer periphery of the optical fiber assembly 10 in a state in which the longitudinal direction of the wrapping tape 21 corresponds to the axial direction of the optical fiber cable 1 and the width direction of the wrapping tape 21 corresponds to the circumferential direction of the optical fiber cable 1. The winding method of the wrapping tape 21 is not particularly limited to the above and may be, for example, horizontal winding (spiral winding).

Here, when the wrapping tape 21 is wound around the optical fiber assembly 10, both ends of the wrapping tape 21 may not be laid on each other (that is, the lap portion 22 may not be formed), or both ends of the wrapping tape 21 may be laid to each other to from the lap portion 22. The effect of the inner recesses 22 can be enhanced by not forming the lap portion 22 in the wrapping tube 20. When the lap portion 22 is formed in the wrapping tube 20, the effect of the inner recesses 42 can be enhanced as the width of the lap portion 22 is narrower. The thickness of the lap portion 22 may be set to be equal to or less than the thickness of the non-lap portion by thinning both ends of the wrapping tape 21 that become the lap portion 22.

Further, when the wrapping tape 21 is longitudinally wound, as shown in FIG. 1, the lap portion 22 may not be overlapped with the inner recess 42 of the inner circumferential surface 40 by overlapping the lap portion 22 with the main surface 41 of the inner circumferential surface 40 of the sheath 30 toward the radial direction of the optical fiber cable 1. As a result, since the following of the shape of the wrapping tube 20 to the inner recess 42 at the time of shrinkage of the sheath 30 is not hindered, it is possible to obtain an effect close to the case where the wrapping tube 20 does not have the lap portion 22.

The wrapping tape 21 is constituted by a nonwoven fabric or a film. Although not particularly limited, as specific examples of the nonwoven fabric constituting the wrapping tape 21, nonwoven fabrics made of fibers such as polyester, polyethylene (PE), and polypropylene (PP) can be exemplified. On the other hand, although not particularly limited, as specific examples of the film constituting the wrapping tape 21, a film made of a resin such as polyethylene (PE), polypropylene (PP), polyethylene terephthalate (PET), polybutylene terephthalate (PBT), and nylon can be exemplified.

The wrapping tape 21 has such rigidity that the wrapping tape 21 can follow the deformation of the sheath 30 and the shape change of the optical fiber assembly 10 and the cross-sectional shape of the space surrounded by the wrapping tube 20 can be deformed. The rigidity of the wrapping tape 21 can be set according to the material and thickness of the wrapping tape 21. Further, the wrapping tape 21 may have a strength enough to protect the optical fiber 11 from the blade when the sheath 30 is cut.

In the case where the wrapping tape 21 is constituted by nonwoven fabric, the wrapping tube 20 may function as a water absorbing layer for stopping water into the optical fiber cable 1 by adding a water absorbing powder to the nonwoven fabric. At the time of water immersion, the water absorbing powder swells and seals the gap in the optical fiber cable 1 to stop the water inside the optical fiber cable 1.

Although not particularly limited, as specific examples of the water absorbing powder, material having high absorbency such as a starch-based material, a cellulose-based material, a polyacrylic acid-based material, a polyvinyl alcohol-based material, and a polyoxyethylene-based material, and mixtures thereof can be exemplified. As a method of adding the water absorbing powder to the nonwoven fabric, the water absorbing powder may be attached (applied) to the surface of the nonwoven fabric or may be interposed between two nonwoven fabrics.

The sheath (jacket) 30 is a cylindrical member covering the outer periphery of the wrapping tube 20. The optical fiber assembly 10 wrapped in the wrapping tube 20 is housed in the inner space of the sheath 30. As examples of the material of which the sheath 30 is made, a resin material such as polyvinyl chloride (PVC), polyethylene (PE), nylon, ethylene fluoride, and polypropylene (PP) can be exemplified.

Multiple (sixteen (16) in one or more embodiments) tensile strength members 60 are embedded in the sheath 30. Each of the tensile strength members 60 is a linear member for suppressing distortion and bending applied to the optical fiber 11 due to shrinkage of the sheath 30. In one or more embodiments, the tensile strength members 60 are arranged along the circumferential direction of the optical fiber cable 1 and are disposed at substantially equal intervals.

The number of tensile strength members 60 included in the optical fiber cable 1 is not particularly limited to the above. In one or more embodiments, each of the tensile strength member 60 is constituted by a single rod. However not particularly limited to the above, each of the tensile strength members 60 may be constituted by a plurality of rods. The tensile strength members 60 may not be embedded in the sheath 30.

In one or more embodiments, since the twisting method of the optical fiber assembly 10 is the SZ twisting manner as described above, the tensile strength members 60 also extend in the axial direction of the optical fiber cable 1 while reversing the rotational direction at a predetermined cycle following the twisting of the optical fiber assembly 10. The tensile strength members 60 extend substantially parallel to each other. In the case where the twisting method of the optical fiber assembly 10 is the unidirectional twisting manner, the tensile strength members 60 spirally extend along the axial direction of the optical fiber cable 1 following the twisting of the optical fiber assembly 10. Alternatively, the tensile strength members 60 may extend substantially parallel to the axial direction of the optical fiber cable 1 without following the twisting of the optical fiber assembly 10.

As examples of the material of which the tensile strength member 60 is made, a non-metallic material and a metallic material can be exemplified. Although not particularly limited, as specific examples of the non-metallic material, fiber reinforced plastics (FRP) such as glass fiber reinforced plastic (GFRP), aramid fiber reinforced plastic (KFRP) reinforced with Kevlar (registered trademark), and polyethylene fiber reinforced plastic reinforced with polyethylene fiber can be exemplified. On the other hand, although not particularly limited, as specific examples of the metallic material, a metal wire such as a copper wire can be exemplified.

The sheath 30 in one or more embodiments includes multiple inner recesses 42 formed on the inner circumferential surface 40 of the sheath 30, and multiple outer protrusions 51 formed on the outer circumferential surface 50 of the sheath 30.

Each of the inner recesses 42 is a linear groove extending in the axial direction of the optical fiber cable 1 while reversing the rotation direction at a predetermined cycle following the twisting of the optical fiber assembly 10. Each of the outer protrusions 51 is also a linear protrusion extending in the axial direction of the optical fiber cable 1 while reversing the rotation direction at a predetermined cycle following the twisting of the optical fiber assembly 10. In the case where the twisting method of the optical fiber assembly 10 is the unidirectional twisting manner, the inner recesses 42 and the outer protrusions 51 spirally extend along the axial direction of the optical fiber cable 1 following the twisting of the optical fiber assembly 10.

The inner recesses 42 may extend substantially parallel to the axial direction of the optical fiber cable 1 without following the twisting of the optical fiber assembly 10. However, by following the inner recesses 42 to the twisting of the optical fiber assembly 10, the wrapping tube 20 and the optical fiber 11 can easily enter (i.e., accommodated within) the space 45 formed by the inner recess 42 at the time of the shrinkage of the sheath 30.

The inner recesses 42 are formed on the inner circumferential surface 40 of the sheath 30 and are disposed at substantially equal intervals along the circumferential direction of the sheath 30. Each of the inner recesses 42 is recessed toward the radially outer side of the optical fiber cable 1. In one or more embodiments, the radially outer side of the optical fiber cable 1 is a direction from the center of the optical fiber cable 1 toward the outer side of the sheath 30.

The main surface 41 of the inner circumferential surface 40 is interposed between the inner recesses 42 adjacent to each other along the circumferential direction of the optical fiber cable 1. The main surface 41 has a gentle arc shape, and the multiple main surfaces 41 forms a circumference that is concentric with the optical fiber cable 1 by arranging the multiple main surfaces 41 in the circumferential direction. The virtual inscribed circle 43 inscribed in all the main surfaces 41 defines the outer periphery of the wrapping tube 20 wrapping around the optical fiber assembly 10. Therefore, a space 45 is formed between the wrapping tube 20 and the sheath 30 by the inner recess 42.

Here, since the space 45 of the inner recess 42 that can be effectively utilized at the time of the shrinkage of the sheath 30 is reduced by the thickness of the wrapping tape 21, the cross-sectional area, the width, the depth, and the like of the inner recess 42 may be designed in consideration of the shrinkage amount of the sheath 30 and the thickness of the wrapping tube 20. The width of each main surface 41 in the inner circumferential surface 40 of the sheath 30, and the ratio and number of main surfaces 41 in the inner circumferential surface 40 are preferably set to such an extent that the wrapping tube 20 maintains the inscribed circle 43.

For example, the ratio P of the main surface 41 with respect to the above inscribed circle 43 (the ratio P (P-CL1/CL0×100) of the total CL1 of the lengths of all the main surfaces 41 with respect to the total length CL0 of the inscribed circle 43) can be 20% or more and 80% or less ($20\% \leq P \leq 80\%$), preferably 40% or more and 60% or less ($40\% \leq P \leq 60\%$).

In FIG. 1, the inscribed circle 43 is illustrated as being separated from the main surface 41 of the inner circumferential surface 40 for convenience, but the inscribed circle 43 actually matches the main surface 41. Further, in FIG. 1, the inscribed circle 43 is illustrated as being separated from the wrapping tube 20 for convenience, but the inscribed circle 43 actually contacts the outer circumferential surface of the wrapping tube 20.

As shown in FIG. 2, each of the inner recesses 42 has a substantially triangular cross-sectional shape in which an apex toward the radially outer side of the optical fiber cable 1 has an arc shape. Specifically, the inner recess 42 has a bottom 421 and a pair of sidewalls 422 and 423.

In one or more embodiments, the bottom 421 has an arc shape. The curvature R1 of the arc shape of the bottom 421 is preferably 0.1 mm or more ($R \geq 120.1$ mm). As a result, it is possible to suppress the occurrence of cracks in the bottom 421 of the inner recess 42 due to the stress concentration as compared with a case where the bottom of the inner recess has an angular apex. The curvature R1 of the arc shape of the bottom 421 is preferably less than or equal to 1.0 mm ($R1 \leq 1.0$ mm), thereby the connecting portions between the bottom 421 and the sidewalls 422 and 423 do not form angular apexes.

The first and second sidewalls 422 and 423 are connected to both ends of the bottom 421. The first and second side walls 422 and 423 are inclined with respect to the radial direction of the optical fiber cable 1. Specifically, the first and second sidewalls 422 and 423 are inclined away from each other toward the radially inner side of the optical fiber cable 1.

In one or more embodiments, the angle θ formed between the first sidewall 422 and the second sidewall 423 is preferably 90 degrees or more)(θ≥90°, thereby it is possible to further suppress the occurrence of cracks in the bottom 421 of the inner recess 32 due to stress concentration. Further, the angle θ formed between the first and second sidewalls 422 and 423 is preferably 150 degrees or less (θ≤150 degrees), thereby it is possible to secure the main surface 41 having a sufficient width for pressing the wrapping tube 20 by the inscribed circle 43.

In one or more embodiments, each of the side portions 422 and 423 have a linear shape, and the cross-sectional shape of the inner recess 42 has a substantially triangular shape, but not particularly limited to the above. For example, each of the side portions 422 and 423 may have a curved shape, and the cross-sectional shape of the inner recess 42 may be a substantially convex curved shape toward the radially outer side of the optical fiber cable 1. Although the cross-sectional shape of the inner recess 42 is not particularly limited, it may form a substantially sinusoidal shape together with the main surface 41 of the inner circumferential surface 40 of the sheath 30. In the case, the angle θ is an angle between the tangent lines of the side portions 422 and 423, and the tangent lines are tangent lines of the side portions 422 and 423 at a middle point in the depth direction from the main surface 41.

The opening 424 of the inner recess 42 is defined by the end 422a on the radially inner side of optical fiber cable 1 in the first side wall 422 and the end 423a on the radially inner side of optical fiber cable 1 in the second side wall 423.

Each of the ends 422a and 423a of the first and second side walls 422 and 423 also has an arc shape. The curvature R2 of the arc shape of each of the ends 422a and 423a is preferably equal to or greater than 0.1 mm (R≥220.1 mm) and preferably equal to or less than 5.0 mm (R2≤5.0 mm). By setting the curvature R2 of the arc shape of each of the first and second sidewalls 422 and 423 to be within the above-described limits, it is possible to prevent the stresses from being concentrated on the optical fibers 11 due to the abutment of the ends 422a and 423a of the first and second sidewalls 422 and 423 at the time of the shrinkage of the sheath 30.

On the other hand, as shown in FIG. 1, the outer protrusions 51 are formed on the outer circumferential surface 50 of the sheath 30 and are disposed at substantially equal intervals along the circumferential direction of the sheath 30. Each of the outer protrusions 51 protrudes toward the radially outer side of the optical fiber cable 1. Further, each of the outer recesses 52 is complementarily formed between the outer protrusions 51 adjacent to each other along the circumferential direction of the optical fiber cable 1. Each of the outer recesses 52 is relatively recessed toward the radially inner side of the optical fiber cable 1 as compared with the outer protrusion 51.

Each of the outer protrusions 51 has a tip that faces toward the radially outer side of the optical fiber cable 1, and the tip has an arc shape. When installing the optical fiber cable 1 in the existing duct, it is possible to reduce the friction occurring with the inner wall surface or the like of the duct by the sheath 30 having such multiple outer protrusions 51. In a case where the effect of reducing friction is not required, the outer protrusions 51 may not be formed in the sheath 30.

The sheath 30 of one or more embodiments has the same number (sixteen (16) in one or more embodiments) of the inner recess 42 as the number of the tensile strength 60. As shown in FIG. 1, the inner recesses 42 are disposed so as to overlap with the tensile strength members 60 toward the radial direction of the optical fiber cable 1, and the tensile strength members 60 are positioned on the radially outer side of the optical fiber cable 1 with respect to the inner recesses 42. Accordingly, when the stress is concentrated in the inner recess 42 and the crack progresses, it is possible to stop the progress of the crack by the tensile strength member 60 positioned on the radially outer side with respect to the inner recess 42. Although not particularly limited, it is preferable that the center of the inner recess 42 and the center of the tensile strength member 60 substantially match with each other toward the radial direction of the optical fiber cable 1.

The sheath 30 has the same number (sixteen (16) in one or more embodiments) of the outer protrusion 51 as the number of the tensile strength member 60. The outer protrusions 51 are disposed so as to overlap with the tensile strength members 60 toward the radial direction of the optical fiber cable 1, and the outer protrusions 51 are positioned on the radially outer side of the optical fiber cable 1 with respect to the tensile strength members 60. That is, in one or more embodiments, the inner recess 42, the tensile strength member 60, and the outer convex portion 51 overlap with each other toward the radial direction of the optical fiber cable 1. It is possible to increase the thickness of the portion of the sheath 30 where the space is formed by the inner recess 42 by adopting such an arrangement. Although not particularly limited, it is preferable that the center of the outer protrusion 51 and the center of the tensile strength member 60 substantially match with each other toward the radial direction of the optical fiber cable 1.

As described above, in one or more embodiments, the inner recesses 42 that are recessed toward the radially outer side of the optical fiber cable 1 are formed on the inner circumferential surface 40 of the sheath 30, and the space 45 is formed between the wrapping tube 20 and the sheath 30 by the inner recesses 42. Accordingly, in one or more embodiments, since the inner area of the sheath 30 can be increased while the outer diameter of the optical fiber cable 1 is maintained, it is possible to reduce the packing density of the optical fiber 11.

Even if the sheath 30 shrinks at a low temperature, the wrapping tube 20 and the optical fiber 11 can enter the space 45 formed by the inner recess 42. Therefore, it is possible to suppress the application of the stress to the optical fiber 11 due to the shrinkage of the sheath 30, and it is possible to suppress the deterioration of the transmission characteristics of the optical fiber 11 at a low temperature.

Further, in one or more embodiments, the wrapping tube 20 wrapping around the optical fiber assembly 10 is pressed by the main surfaces (contact surfaces) 41 of the inner circumferential surface 40 of the sheath 30, and the outer periphery of the wrapping tube 20 is the inscribed circle 43 having an inner diameter equivalent to the sheath having no inner recess 42. Therefore, even if the inner area of the sheath 30 is increased for reducing the packing density of the optical fiber 11, it is possible to maintain the pull-out force of the optical fiber.

Here, optical fiber cables according to Example, Comparative Example 1, and Comparative Example 2 were produced. Example 1 is an optical fiber cable having the configuration shown in FIG. 1 and has eight hundred and sixty-four (864) optical fibers, and the cross-sectional area (inner area) of the inner space of the sheath is 89.0 mm² as shown in Table 1 below. On the other hand, Comparative Example 1 has the same configuration as that of Example 1 except that (1) the sheath does not have inner recesses. The inner area of the sheath of Comparative Example 1 is 87.3 mm². Comparative Example 2 has the same configuration as that of Example 1 except that (1) the sheath does not have inner recesses and (2) the inner area of the sheath is substantially the same as the inner area of the sheath including the inner recesses in Example. The inner area of the sheath of Comparative Example 1 is 88.9 mm².

TABLE 1

| | Example | Comparative Example 1 | Comparative Example 2 |
|---|---|---|---|
| Number of optical fibers [number] | 864 | 864 | 864 |
| Inner area of sheath [mm²] | 89.0 | 87.3 | 88.9 |
| Thickness of wrapping tube [mm] | 0.2 | 0.2 | 0.2 |
| Presence or absence of inner recess | Presence | Absence | Absence |
| Equivalent linear expansion coefficient of cable jacket [×10⁻⁵/° C.] | 2.59 | 2.59 | — |
| Inner area of sheath if ignoring the inner recess [mm²] | 87.2 | (87.3) | (88.9) |
| Pull-out force [N/10 m] | 55 | 55 | — |
| Pull-out of optical fiber | ○ | ○ | x |
| Temperature loss characteristics | ○ | x | — |

Then, the pull-out force of the optical fiber was evaluated for the above Example, Comparative Example 1, and Comparative Example 2, and the transmission loss at the time of temperature change was evaluated for Example and Comparative Example 1.

In evaluating the pull-out force, an optical fiber cable having a length 10 m and having portions where the optical fiber protrudes from both ends was prepared, one end of the optical fiber was pulled by a load measuring device, and the load at which the other end of the optical fiber started to move was measured as the pull-out force. In Table 1 above, in the column of "Pull-out of optical fiber", "o" means that pull-out force is equal to or greater than a predetermined value and no pull-out of the optical fiber occurs, and "×" means that the optical fiber was pulled out before the pull-out force reached the predetermined value.

As shown in Table 1 above, in both of Example and Comparative Example 1, the pull-out force was sufficient, and the optical fiber was not pulled out. On the other hand, in Comparative Example 2, since there was no inner recess and the packing density was low, the pull-out force was insufficient, and the optical fiber was pulled out immediately after starting to pull the optical fiber.

In the evaluation of the transmission loss at the time of temperature change, in accordance with the provision of "Temperature cycling" in the "Telcordia Technologies Generic Requirements GR-20-CORE Issue 4, July 2013", the optical fiber cables of Example and Comparative Example 1 were subjected to two cycles of temperature change in the range of −40° C. to +70° C. to measure the maximum loss variation at the measurement wavelength of 1.55 µm. In Table 1 above, in the column of "temperature loss characteristics", "○" means that the transmission characteristics of the optical fiber cable at the time of temperature change is good, "×" means that the transmission characteristics of the optical fiber cable at the time of temperature change is insufficient.

In Example, the maximum loss variation in the transmission loss evaluation is equal to or less than 0.15 dB/km. On the other hand, in Comparative Example 1, since the inner area of the sheath was small, the maximum loss variation in the transmission loss evaluation was over 0.15 dB/km.

As described above, by forming the plurality of inner recesses 42 on the inner circumferential surface 40 of the sheath 30, it is possible to reduce the packing density of the optical fiber 11 while maintaining the outer diameter of the optical fiber cable 1 and the pull-out force of the optical fiber 11.

Further, in one or more embodiments, since the plurality of inner recesses 42 are formed on the inner circumferential surface 40 of the sheath 30, the volume of the sheath 30 is reduced by an amount corresponding to the inner recesses 42 as compared with a sheath having no inner recesses 42. Therefore, the amount of shrinkage of the sheath 30 itself at low temperature is also reduced.

Further, in the optical fiber cable of the type in which a plurality of tensile strength member is disposed in the sheath along the circumferential direction of the sheath, the exposing process of the optical fiber is performed by bending and cutting the sheath and the tensile strength member after cutting into the sheath. However, the portion of the sheath inside the tensile strength member hardly cut, and the workability of the exposing process is low. On the other hand, in one or more embodiments, since the portion of the sheath 30 inside the tensile strength member 60 is thinned by the inner recess 42, the sheath 30 can be easily cut out, and the workability of the exposing process can be improved.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATIONS OF LETTERS OR NUMERALS

1 . . . Optical fiber cable
10 . . . Optical fiber assembly
11 . . . Optical fiber
20 . . . Wrapping tube
21 . . . Wrapping tape
22 . . . Lap portion
30 . . . Sheath
40 . . . Inner circumferential surface
41 . . . Main surface
42 . . . Inner recess
421 . . . Bottom
422 and 423 . . . Sidewall
422a and 423a . . . End
424 . . . Opening
43 . . . Inscribed circle
45 . . . Space
50 . . . Outer circumferential surface
51 . . . Outer protrusion
52 . . . Outer recess
60 . . . Tensile strength member
The invention claimed is:
1. An optical fiber cable comprising:
optical fibers;
a wrapping tube that wraps around the optical fibers and contacts outermost ones of the optical fibers; and a sheath that covers the wrapping tube and has recesses on an inner circumferential surface of the sheath, wherein the recesses are recessed toward a radially outer side of the optical fiber cable such that a space exists between the wrapping tube and the sheath in each of the recesses, and each of the recesses is configured to receive a different one of the optical fibers when the sheath shrinks.

2. The optical fiber cable according to claim 1, wherein each of the recesses includes an arc shape bottom.

3. The optical fiber cable according to claim 2, wherein each of the recesses includes first and second sidewalls connected to the arc shape bottom, and an angle between the first sidewall and the second sidewall is equal to or greater than 90 degrees.

4. The optical fiber cable according to claim 2, wherein each of the recesses includes first and second sidewalls connected to the arc shape bottom, and an end of the first sidewall on a radially inner side of the optical fiber cable and an end of the second sidewall on the radically inner side have an arc shape.

5. The optical fiber cable according to claim 1, further comprising:

a tensile strength member embedded in the sheath, wherein one of the recesses overlaps the tensile strength member toward a radial direction of the optical fiber cable.

6. The optical fiber cable according to claim 1, wherein the sheath has protrusions on an outer circumferential surface of the sheath, the protrusions protrude toward the radially outer side of the optical fiber cable, and one of the recesses overlaps one of the protrusions toward a radial direction of the optical fiber cable.

7. The optical fiber cable according to claim 1, wherein the optical fiber cable is a slotless-type optical fiber cable having no rod with slots.

8. The optical fiber cable according to claim 1, wherein the wrapping tube comprises a wrapping tape longitudinally wound around the optical fibers, and the wrapping tape has a lap portion in which one end of the wrapping tape overlaps another end of the wrapping tape without overlapping any of the recesses toward a radial direction of the optical fiber cable.

9. The optical fiber cable according to claim 1, wherein the sheath includes main surfaces between the recesses adjacent to each other along a circumferential direction of the optical fiber cable, and $20\% \leq CL1/CL0 \times 100 \leq 80\%$ is met, where CL0 is a length of a virtual inscribed circle inscribed in the main surfaces, and CL1 is a total length of the main surfaces.

10. The optical fiber cable according to claim 1, wherein none of the recesses accommodates any of the optical fibers.

11. The optical fiber cable according to claim 1, further comprising:

optical fiber ribbons each comprising the optical fibers intermittently fixed to each other, wherein the wrapping tube wraps around the optical ribbons, and the optical fiber cable is a slotless-type optical fiber cable having no rod with slots.

* * * * *